(12) United States Patent
Roh

(10) Patent No.: US 10,608,573 B2
(45) Date of Patent: Mar. 31, 2020

(54) METHOD AND APPARATUS FOR PROTECTING CIRCUIT

(71) Applicant: Samsung Electronics Co., Ltd., Suwon-si, Gyeonggi-do (KR)

(72) Inventor: ChangHyun Roh, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 884 days.

(21) Appl. No.: 14/984,826

(22) Filed: Dec. 30, 2015

(65) Prior Publication Data

US 2017/0063278 A1    Mar. 2, 2017

(30) Foreign Application Priority Data

Aug. 26, 2015  (KR) .......................... 10-2015-0120562

(51) Int. Cl.
*A61H 3/00* (2006.01)
*A61H 1/02* (2006.01)
(Continued)

(52) U.S. Cl.
CPC ......... *H02P 29/024* (2013.01); *A61H 1/0244* (2013.01); *A61H 3/00* (2013.01); (Continued)

(58) Field of Classification Search
CPC ...... H02P 29/024; H02P 6/14; H02P 29/0241; H02P 9/006; H02P 6/182; A61H 1/0244; A61H 3/00; A61H 2201/5079; A61H 2201/1676; A61H 2201/5069; A61H 2201/165; A61H 2201/164; A61H 2230/60; A61H 2201/1671; A61H 2201/1207; A61H 2003/007; A61H 2201/1628; A61H 2201/1642; A61H 2201/5007; H02H 7/09
See application file for complete search history.

(56) References Cited

U.S. PATENT DOCUMENTS 5,929,576 A    7/1999  Yasohara et al.
2006/0290312 A1*  12/2006  Nagai ..................... H02P 6/182
                                                                      318/599
(Continued)

FOREIGN PATENT DOCUMENTS

JP    2009183407 A    8/2009
JP    2012125477 A    7/2012
(Continued)

OTHER PUBLICATIONS

Extended European Search Report issued by the European Patent Office dated Jan. 19, 2017 for corresponding EP Patent Application No. 16182198.8.

*Primary Examiner* — Quang D Thanh
(74) *Attorney, Agent, or Firm* — Harness, Dickey, & Pierce, P.L.C.

(57) ABSTRACT

A method and apparatus for protecting a circuit are provided. The method and apparatus may measure a physical quantity of a motor by an external physical stimulus, may calculate a counter electromotive voltage generated by the motor, based on the physical quantity, may compare the counter electromotive voltage to an output voltage, and may control a circuit connected to the motor to be open when the counter electromotive voltage is greater than the output voltage.

16 Claims, 5 Drawing Sheets

(51) Int. Cl.
  *H02P 29/024* (2016.01)
  *H02P 6/14* (2016.01)
  *H02P 6/182* (2016.01)
  *H02P 9/00* (2006.01)
  *H02H 7/085* (2006.01)
  *H02H 7/09* (2006.01)

(52) U.S. Cl.
  CPC .......... *H02H 7/0854* (2013.01); *H02P 6/14* (2013.01); *H02P 6/182* (2013.01); *H02P 9/006* (2013.01); *H02P 29/0241* (2016.02); *A61H 2003/007* (2013.01); *A61H 2201/1207* (2013.01); *A61H 2201/164* (2013.01); *A61H 2201/165* (2013.01); *A61H 2201/1628* (2013.01); *A61H 2201/1642* (2013.01); *A61H 2201/1671* (2013.01); *A61H 2201/1676* (2013.01); *A61H 2201/5007* (2013.01); *A61H 2201/5069* (2013.01); *A61H 2201/5079* (2013.01); *A61H 2230/60* (2013.01); *H02H 7/09* (2013.01)

(56) References Cited

U.S. PATENT DOCUMENTS

| | | | |
|---|---|---|---|
| 2010/0219781 A1* | 9/2010 | Kuwamura | H02P 6/085 318/400.04 |
| 2012/0095373 A1 | 4/2012 | Hirata et al. | |
| 2012/0101415 A1 | 4/2012 | Goffer | |
| 2013/0257326 A1* | 10/2013 | Winker | H02P 6/182 318/400.11 |
| 2013/0289452 A1* | 10/2013 | Smith | B25J 9/0006 601/33 |
| 2014/0117895 A1* | 5/2014 | Lee | H02P 6/17 318/400.11 |
| 2014/0277739 A1* | 9/2014 | Kornbluh | B25J 9/0006 700/260 |
| 2015/0155813 A1 | 6/2015 | Park et al. | |
| 2015/0381102 A1* | 12/2015 | Sun | F25D 17/062 62/428 |
| 2016/0028344 A1* | 1/2016 | Kusakawa | H02P 27/04 318/139 |
| 2016/0141994 A1* | 5/2016 | Takase | H02P 21/28 318/135 |

FOREIGN PATENT DOCUMENTS

| | | |
|---|---|---|
| JP | 2015083091 A | 4/2015 |
| KR | 20110064600 A | 6/2011 |
| KR | 20110073168 A | 6/2011 |
| KR | 20120072249 A | 7/2012 |
| WO | WO 2009/125683 A1 | 10/2009 |
| WO | WO 2014/151065 A2 | 9/2014 |
| WO | WO 2014/151584 A1 | 9/2014 |

* cited by examiner

METHOD AND APPARATUS FOR PROTECTING CIRCUIT

CROSS-REFERENCE TO RELATED APPLICATION

This application claims under 35 U.S.C. § 119 to Korean Patent Application No. 10-2015-0120562, filed on Aug. 26, 2015, in the Korean Intellectual Property Office, the entire contents of which are incorporated herein by reference in its entirety.

BACKGROUND

1. Field

At least one example embodiment relates to a method and/or an apparatus configured to protect a circuit. For example, at least one example embodiment relates to a method and/or an apparatus configured to protect a circuit from a counter electromotive voltage generated by a motor.

2. Description of the Related Art

A circuit (e.g. a driving circuit) may be configured to drive a motor by transferring a current to the motor, and the motor may generate a torque by rotating a shaft thereof based on the received current. Therefore, the motor may be referred to as a driving device that consumes a current or voltage.

Further, when the shaft of the motor is rotated by an external force different from the current provided by the current, the motor itself may generate a current, and a voltage may also be generated based on the generated current. Therefore, the motor may be referred to as a generator that generates a current or voltage. A magnitude of the current or voltage generated by the motor may be in proportional to a speed at which the shaft rotates.

Therefore, even though the motor is manufactured to operate as a driving device, the motor may unintentionally operate as a generator, when the external force is exerted on the motor. The driving circuit may be affected by the generated current or voltage.

SUMMARY

Some example embodiments relate to a circuit protection method.

In some example embodiments, the method includes measuring a physical quantity of a motor generated based on an external physical stimulus; calculating a counter electromotive voltage based on the physical quantity, the counter electromotive voltage being a voltage generated by the motor; and controlling a circuit connected to the motor based on whether the counter electromotive voltage is greater than an output voltage.

In some example embodiments, the external physical stimulus is an external force applied to the motor, and the physical quantity is a speed at which a shaft of the motor rotates in response thereto.

In some example embodiments, the method includes closing the circuit when the counter electromotive voltage is equal to or less than the output voltage.

In some example embodiments, the measuring of the physical quantity includes measuring, via at least one of an encoder and a hall sensor, the speed of the shaft.

In some example embodiments, the measuring of the physical quantity includes measuring, via a rotation sensor, a second speed at which a load mechanically connected to the motor rotates; and calculating the speed based on the second speed.

In some example embodiments, the calculating the speed includes calculating the speed based on a gear ratio between the rotation sensor and the motor.

In some example embodiments, the calculating the counter electromotive voltage includes calculating the counter electromotive voltage based on the speed and a motor constant associated with the motor.

In some example embodiments, the output voltage is a voltage supported by the circuit.

In some example embodiments, the circuit is included in a walking assistance apparatus.

In some example embodiments, the method includes driving, via the output voltage, the motor based on an gait status of a user wearing the walking assistance apparatus.

Some example embodiments relate to a circuit protection apparatus.

In some example embodiments, the apparatus includes a switch configured to open a circuit connected to a motor based on a control signal; and a processor configured to, measure a physical quantity of the motor generated based on an external physical stimulus, calculate a counter electromotive voltage based on the physical quantity, the counter electromotive voltage being generated by the motor, and generate the control signal based on whether the counter electromotive voltage is greater than an output voltage.

In some example embodiments, the external physical stimulus is an external force applied to the motor, and the physical quantity is a speed at which a shaft of the motor rotates in response thereto.

In some example embodiments, the processor is configured to generate a second control signal when the counter electromotive voltage is equal to or less than the output voltage, and the switch is configured to close the circuit based on the second control signal.

In some example embodiments, the apparatus includes at least one of a hall sensor and an encoder connected to the motor, and wherein the processor is configured to measure the speed based on a signal generated using the at least one of the encoder and the hall sensor.

In some example embodiments, the apparatus further includes a rotation sensor configured to measure a second speed at which a load mechanically connected to the motor rotates, wherein the processor is configured to calculate the speed based on the second speed.

In some example embodiments, the processor is configured to calculate the speed based on a gear ratio between the rotation sensor and the motor.

In some example embodiments, the processor is configured to calculate the counter electromotive voltage based on the speed and a motor constant associated with the motor.

In some example embodiments, the output voltage is a maximum voltage supported by the circuit.

In some example embodiments, the circuit is included in a walking assistance apparatus.

In some example embodiments, the walking assistance apparatus is configured to drive, via the output voltage, the motor based on an gait status of a user wearing the walking assistance apparatus.

Some example embodiments relate to a walking assistance apparatus configured to be worn by a user.

In some example embodiments, the walking assistance apparatus includes a driver configured to drive a motor to apply a torque to a joint of the user; and a controller configured to generate a control signal to electrically isolate the driver from the motor based on a counter electromotive voltage generated by the motor.

In some example embodiments, the controller is configured to measure a speed associated with one of the motor and a load thereof generated in response to an external physical stimulus applied thereto, and calculate the counter electromotive voltage based on the speed.

In some example embodiments, the processor is configured to calculate the counter electromotive voltage by, measuring one of a first speed and a second speed, the first speed being associated with a shaft of the motor and the second speed being associated with the load mechanically connected thereto, and calculating the counter electromotive voltage based on the one of the first speed and the second speed.

In some example embodiments, the processor is configured to, measure, via one of an encoder and a hall sensor, the first speed of the shaft; and measure, via a rotation sensor, the second speed at which the load mechanically connected to the motor rotates.

In some example embodiments, the walking assistance apparatus includes a switch configured to open based on the control signal such that the driver is electrically isolated from the motor.

In some example embodiments, the controller is configured to, determine if the counter electromotive voltage is greater than a driving voltage supportable by the driver, and generate the control signal to open the switch such the motor is that electrically isolated from the driver, if the controller determines that the electromotive voltage is greater than the driving voltage.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
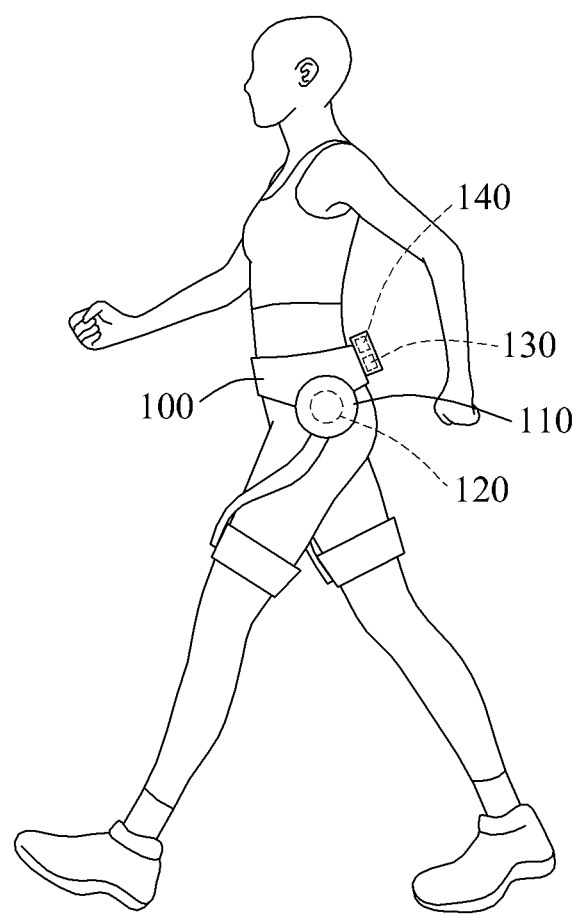
FIGS. 1 and 2 illustrate a walking assistance apparatus according to at least one example embodiment.

Hereinafter, some example embodiments will be described in detail with reference to the accompanying drawings. The scope of the present disclosure, however, should not be construed as limited to the embodiments set forth herein. Like reference numerals in the drawings refer to like elements throughout the present disclosure.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

<Summary of Walking Assistance Apparatus>

Figure 2:
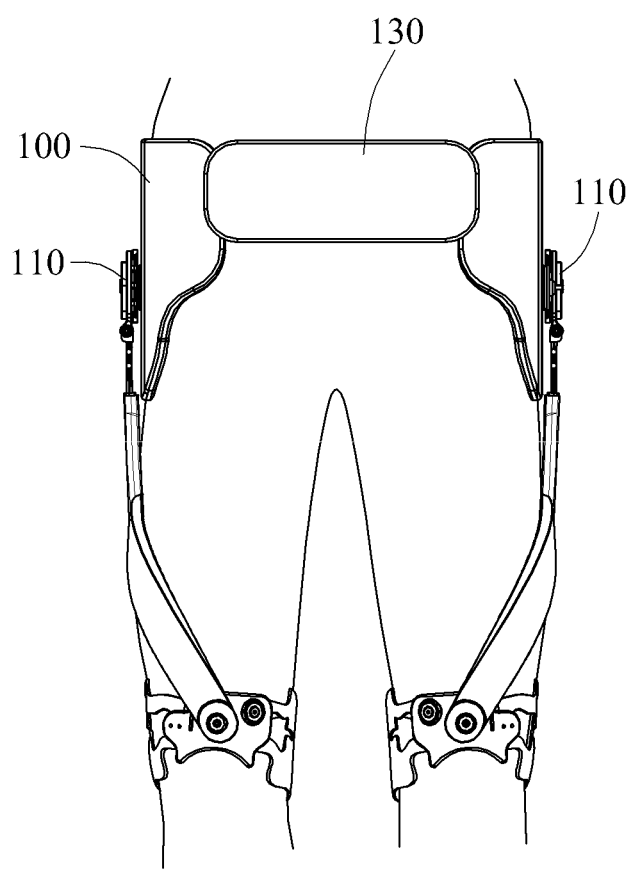

FIGS. 1 and 2 illustrate a walking assistance apparatus 100 according to at least one example embodiment.

Referring to FIG. 1, the walking assistance apparatus 100 may be worn on a user and may assist walking of the user. The walking assistance apparatus 100 may be a wearable device.

FIG. 1 illustrates an example of a hip-type walking assistance apparatus, however, a type of walking assistance apparatuses is not limited to the hip-type walking assistance apparatus. Accordingly, the walking assistance apparatus 100 may be, for example, a walking assistance apparatus for supporting an entire pelvic limb or a walking assistance apparatus for supporting a portion of a pelvic limb. Also, the walking assistance apparatus 100 may be, for example, one of a walking assistance apparatus for supporting a portion of a pelvic limb, a walking assistance apparatus for supporting up to a knee, and a walking assistance apparatus for supporting up to an ankle, and a walking assistance apparatus for supporting a whole body.

Example embodiments described with reference to FIG. 1 and the like may be applicable to a hip-type walking assistance apparatus, however, there is no limitation thereto. Accordingly, example embodiments may be applicable to any type of apparatuses for assisting the user with walking.

Referring to FIG. 1, the walking assistance apparatus 100 may include a driving portion 110, a sensor 120, an inertial measurement unit (IMU) sensor 130, and a controller 140.

The driving portion 110 may drive one or more hip joints of a user. The driving portion 110 may be located on, for example, a right hip portion and/or a left hip portion of the user.

The driving portion 110 may include one or more motors to generate a rotational torque. For example, the driving portion 110 may include a motor associated with each of the one or more hip joints drive therewith.

The sensor 120 may measure hip joint angles of the hip joints of the user while the user is ambulatory. Information about the hip joint angles sensed by the sensor 120 may include, for example, an angle of a right hip joint, an angle of a left hip joint, a difference between both the hip joint angles, and/or a direction of motion for a hip joint. The sensor 120 may be located in, for example, the driving portion 110.

The sensor 120 may include a potentiometer. The potentiometer may sense a right (R)-axis joint angle, a left (L)-axis joint angle, an R-axis joint angular velocity, and an L-axis joint angular velocity, based on a gait motion of the user.

The IMU sensor 130 may measure acceleration information and posture information while the user is ambulatory. For example, the IMU sensor 130 may individually sense an x-axis acceleration, a y-axis acceleration, a z-axis acceleration, an x-axis angular velocity, a y-axis angular velocity and a z-axis angular velocity, based on a gait motion of the user.

The walking assistance apparatus 100 may detect a point at which a foot of the user lands based on the acceleration information measured by the IMU sensor 130.

Alternatively, a pressure sensor (not shown) may be attached to a sole of the user, and may detect a point in time at which a foot of the user lands.

The walking assistance apparatus 100 may include, in addition to the above-described sensor 120 and IMU sensor 130, another sensor (for example, an electromyography (EMG) sensor) configured to sense a change in a biosignal or a quantity of motion of a user based on a gait motion.

The controller 140 may include a memory and a processor, for example, the processor 311, discussed below with reference to FIG. 3.

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The processor may be programmed with instructions that configure the processor into a special purpose computer to perform the operations illustrated in FIGS. 4 and 5 to selectively electronically isolate a motor (e.g. the motor 303, discussed below with reference to FIG. 3) from a circuit (e.g. the driver 302, discussed below with reference to FIG. 3). Therefore the processor may improve the functioning of the controller 140 itself by reducing (or, alternatively to eliminating) potential damage to the driving portion 110 from a counter electromotive voltage generated by a motor (e.g. the motor 303, discussed below with reference to FIG. 3) when the motor generates a voltage in response to an external force applied to a shaft thereof.

The controller 140 may control the driving portion 110 to output an assistance torque to assist walking of the user. When the walking assistance apparatus 100 is a hip-type walking assistance apparatus, two driving portions 110 may be provided for a left hip portion and a right hip portion, and the controller 140 may output a control signal to control the driving portions 110 to generate torques.

The driving portions 110 may generate torques based on the control signal output from the controller 140.

The torques may be set by an external device or the controller 140.

The walking assistance apparatus 100 may include a driving portion 110 for a right leg and a driving portion 110 for a left leg.

In some example embodiments, a plurality of controllers 140 may be provided that are each associated with a respective one of the driving portions 110.

In other example embodiments, a single controller 140 may be designed to control both the driving portions 110.

The motor of the driving portion 110 may operate according to the principles of a generator. In an example, when an external device applies a voltage to the motor, the motor may generate a torque. In another example, when a shaft of the motor is rotated by an external force, the motor may operate as a generator to generate a counter electromotive voltage. For example, as discussed the force generated when a user walks may act as an external force on the motor.

When the external force causes the motor to operate as a generator, the counter electromotive voltage generated by the motor may exceed a maximum voltage allowable by a circuit, for example, a driving circuit. Therefore, the circuit may be damaged.

Walking speeds may vary depending on users. In the above example, based on a walking speed of a user, an environment in which the walking assistance apparatus 100 is used may exceed a design specification of the walking assistance apparatus 100.

When the walking speed exceeds a range of use of the walking assistance apparatus 100, the shaft of the motor may be rotated by receiving a user's force. When the motor operates as a generator, the user may feel resistance to a gait motion.

<Circuit Protection Apparatus>

Figure 3:
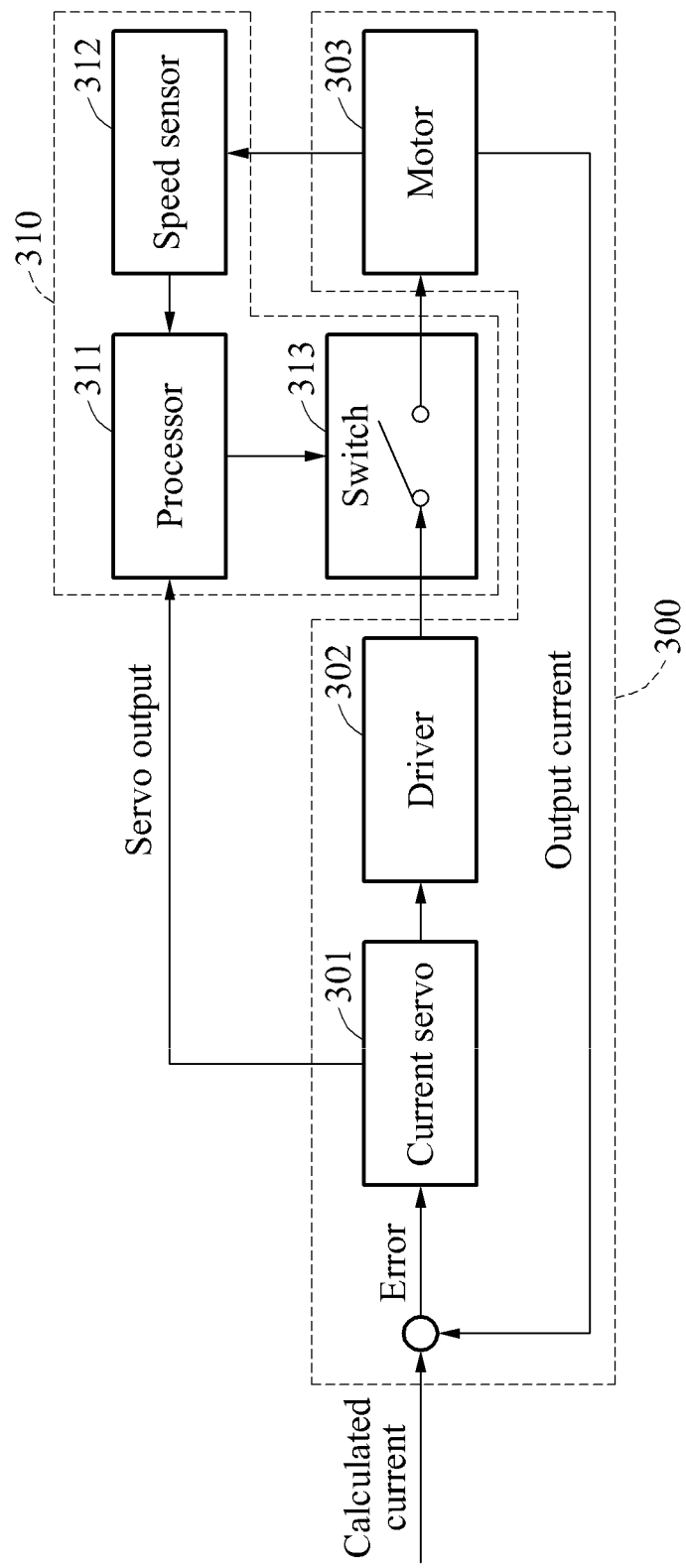
FIG. 3 illustrates a configuration of each of a driving portion and a circuit protection apparatus according to at least one example embodiment.

FIG. 3 illustrates a configuration of each of a driving portion 300 and a circuit protection apparatus 310 according to at least one example embodiment.

Referring to FIG. 3, the driving portion 300 may correspond to the above-described driving portion 110, and the circuit protection apparatus 300 may be included in the controller 140. However, example embodiments are not limited thereto. For example, the circuit protection apparatus 310 may be included in, for example, the walking assistance apparatus 100, however, there is no limitation thereto. For example, the circuit protection apparatus 310 may be included in a general electronic circuit, to protect the electronic circuit.

The driving portion 300 may include a current servo 301, a driver 302, and a motor 303. The current servo 301, the driver 302 and the motor 303 may form a closed circuit of the driving portion 300.

The driving portion 300 may output an assistance torque based on information calculated by the controller 140. The information may include, for example, a current to generate an assistance torque.

The motor 303 may output the assistance torque based on a current.

The current servo 301 may control an output current such that the output current reaches a calculated current through feedback. For example, the current servo 301 may compare the calculated current and the output current. The current servo 301 may calculate a current used to correct a difference between the calculated current and the output current.

The driver 302 may generate a driving pulse based on the current.

The motor 303 may output the assistance torque based on the driving pulse.

A current output by the motor 303 may be fed back to the current servo 301.

The circuit protection apparatus 310 may be connected to the driving portion 300. For example, the circuit protection apparatus 310 may be connected to a circuit of the driving portion 300.

The circuit protection apparatus 310 may include a processor 311, a speed sensor 312 and a switch 313.

The processor 311 may control the speed sensor 312 and the switch 313.

The processor 311 may be, for example, the same processor discussed above in regards to the controller 140 of FIG. 1. For example, the processor associated with the controller 140 may be included in the circuit protection apparatus 310 and may function as the processor 311.

The speed sensor 312 may measure a speed at which a shaft of the motor 303 rotates. In the following description, the speed at which the shaft of the motor 303 rotates may be referred to as a "first speed."

The switch 313 may be located between the driver 302 and the motor 303. The switch 313 may short or open the closed circuit of the driving portion 300.

Hereinafter, the processor 311, the speed sensor 312 and the switch 313 will be further described with reference to FIGS. 4 and 5.

Figure 4:
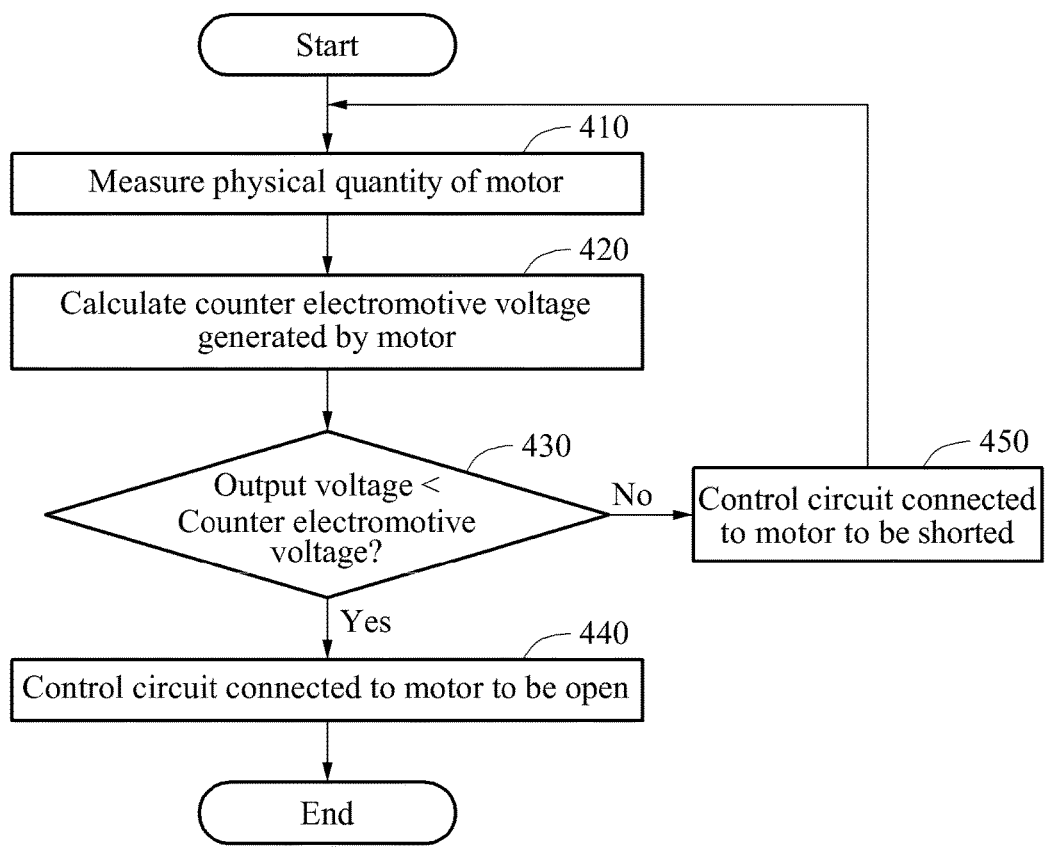
FIG. 4 is a flowchart illustrating a circuit protection method according to at least one example embodiment.

FIG. 4 is a flowchart illustrating a circuit protection method according to at least one example embodiment.

Referring to FIG. 4, in operation 410, the speed sensor 312 may measure a physical quantity of the motor 303 by an external physical stimulus. The external physical stimulus may be, for example, an external force applied to the motor 303, and the measured physical quantity may be, for example, the first speed. For example, the speed sensor 312 may measure a speed at which the shaft of the motor 303 rotates when the external force is applied to the motor 303.

In some example embodiments, the speed sensor 312 may include at least one of an encoder and a hall sensor. In this example, the processor 311 may measure the first speed based on a signal generated by at least one of the encoder and the hall sensor. In other example embodiments, as described in more detail below with reference to FIG. 5, the processor 311 may measure the first speed based on a measured second speed at which a load mechanically connected to the motor 303 rotates.

In operation 420, the processor 311 may calculate a counter electromotive voltage generated by the motor 303. For example, the processor 311 may calculate a counter electromotive voltage generated by the motor 303 in response to the external force.

The counter electromotive voltage may be, for example, a counter electromotive force.

The processor 311 may calculate the counter electromotive voltage based on a motor constant of the motor 303 and the first speed that is measured in operation 410.

In operation 430, the processor 311 may compare the counter electromotive voltage to an output voltage.

In some example embodiments, the output voltage may be a maximum voltage allowable by a circuit of the driving portion 300. The maximum voltage may be determined, for example, based on devices included in the circuit. The maximum voltage may be a condition of an internal voltage of the driver 302.

In other example embodiments, the output voltage may be a driving voltage to drive the motor 303. The driving voltage may be, for example, a voltage to drive the motor 303 based on an gait status of a user wearing the walking assistance apparatus 100.

The processor 311 may receive a current value generated by the current servo 301. The processor 311 may calculate the output voltage based on the received current value.

When the processor 311 determines that the counter electromotive voltage is greater than the output voltage, the processor 311 may perform operation 440. When the processor 311 determines that the counter electromotive voltage is equal to or less than output voltage, the processor 311 may perform operation 450.

In operation 440, the processor 311 may control a circuit connected to the motor 303 to be open, when the counter electromotive voltage is greater than the output voltage.

The processor 311 may control the switch 313 connected to the circuit of the motor 303 to open the circuit. For example, when the circuit is shorted, the processor 311 may control the switch 313 to open the circuit.

When the circuit connected to the motor 303 is open, the motor 303 may be electrically isolated from the circuit (e.g., the driver 302) such that the counter electromotive voltage generated by the motor 303 may not be applied to the circuit. When the circuit is open, the counter electromotive voltage may be drained.

In operation 450, the processor 311 may control the circuit connected to the motor 303 to be shorted, when the counter electromotive voltage is equal to or less than output voltage.

The processor 311 may control the switch 313 connected to the circuit of the motor 303 to short (e.g. close) the circuit. For example, when the circuit is open, the processor 311 may control the switch 313 to close the circuit.

When the circuit is shorted, a current calculated by the controller 140 may be applied to the motor 303. By applying the calculated current to the motor 303, a function of the circuit may be restored.

For example, the circuit of the motor 303 may be included in the walking assistance apparatus 100. In this example, when the circuit is shorted, an assistance torque of the walking assistance apparatus 100 may be output by the motor 303.

By using the circuit protection apparatus 310, it is possible to protect the driver 302 even though a walking speed of the user wearing the walking assistance apparatus 100 exceeds walking criteria.

Also, by using the circuit protection apparatus 310, it is possible to prevent a user from experiencing resistance even though the motor of the walking assistance apparatus 100 operates as a generator. For example, by controlling the switch 313, the circuit protection apparatus 310 may allow the shaft of the motor 303 to freely rotate when the walking assistance apparatus 100 operates as a generator.

Furthermore, by using the circuit protection apparatus 310, it is possible to increase a gear ratio between the motor 303 and the load. When the gear ratio increases, the driving portion 300 may be miniaturized.

Figure 5:
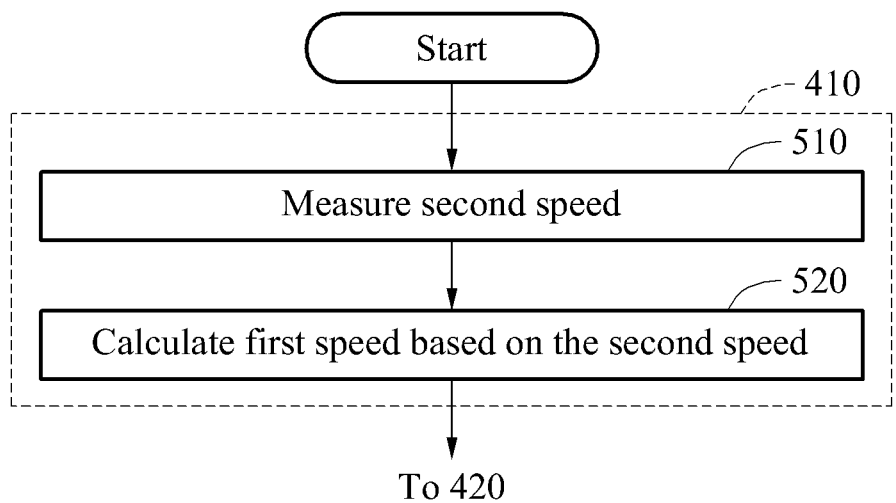
FIG. 5 is a flowchart illustrating an operation of measuring a speed at which a shaft of a motor rotates in the circuit protection method of FIG. 4.

FIG. 5 is a flowchart of an example of operation 410 of FIG. 4.

Referring to FIGS. 4 and 5, in operation 410 of FIG. 4, the processor 311 may perform operations 510 and 520 of FIG. 5.

The load mechanically connected to the motor 303 may be, for example, a supporter configured to transfer an output assistance torque to a leg. The supporter may be connected to the shaft of the motor 303 and may change a hip joint angle using the assistance torque.

In operation 510, the speed sensor 312 may measure the second speed at which the load mechanically connected to the motor 303 rotates. For example, the speed sensor 312 may include a rotation sensor. The rotation sensor may measure a hip joint angle.

For example, the speed sensor 312 may measure an angle at which the supporter rotates, and may measure a speed at which the supporter rotates based on the measured angle, and set the measured speed as the second speed.

In operation 520, the processor 311 may calculate the first speed based on the second speed.

For example, the processor 311 may calculate the first speed based on a gear ratio between the speed sensor 312 and the motor 303.

The units and/or modules described herein may be implemented using hardware components, software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A circuit protection method comprising:
   indirectly measuring a rotational speed of a shaft of a motor generated based on an external physical stimulus by,
      measuring, via a rotation sensor, a joint angle of a support mechanically connected to the motor via gears having a gear ratio,
      determining a speed at which the support rotates based on the joint angle, and
      calculating the rotational speed of the motor based on the speed at which the support rotates and the gear ratio of the gears;

calculating a counter electromotive voltage based on the rotational speed, the counter electromotive voltage being a voltage generated by the motor; and controlling a circuit connected to the motor based on whether the counter electromotive voltage is greater than a set voltage supported by the circuit.

2. The circuit protection method of claim 1, wherein the external physical stimulus is an external force applied to the motor.

3. The circuit protection method of claim 1, further comprising:

closing the circuit when the counter electromotive voltage is equal to or less than the set voltage.

4. The circuit protection method of claim 2, wherein the calculating the counter electromotive voltage comprises:

calculating the counter electromotive voltage based on the rotational speed and a motor constant associated with the motor.

5. The circuit protection method of claim 1, wherein the set voltage is a maximum voltage supported by the circuit.

6. The circuit protection method of claim 1, wherein the circuit is included in a walking assistance apparatus.

7. The circuit protection method of claim 6, further comprising:

driving, via the set voltage, the motor based on an gait status of a user wearing the walking assistance apparatus.

8. A circuit protection apparatus comprising:

a rotation sensor;

a switch configured to open a circuit connected to a motor based on a control signal; and a processor configured to, indirectly measuring a rotational speed of a shaft of the motor generated based on an external physical stimulus by, measuring, via the rotation sensor, a joint angle of a support mechanically connected to the motor via gears having a gear ratio, determining a speed at which the support rotates based on the joint angle, and calculating the rotational speed of the motor based on the speed at which the support rotates and the gear ratio of the gears, calculate a counter electromotive voltage based on rotational speed, the counter electromotive voltage being generated by the motor, and generate the control signal based on whether the counter electromotive voltage is greater than a set voltage supported by the circuit.

9. The circuit protection apparatus of claim 8, wherein the external physical stimulus is an external force applied to the motor.

10. The circuit protection apparatus of claim 8, wherein the processor is configured to generate a second control signal when the counter electromotive voltage is equal to or less than the set voltage, and the switch is configured to close the circuit based on the second control signal.

11. The circuit protection apparatus of claim 9, wherein the processor is configured to calculate the counter electromotive voltage based on the rotational speed of the motor and a motor constant associated with the motor.

12. The circuit protection apparatus of claim 8, wherein the set voltage is a maximum voltage supported by the circuit.

13. The circuit protection apparatus of claim 8, wherein the circuit is included in a walking assistance apparatus.

14. The circuit protection apparatus of claim 13, wherein the walking assistance apparatus is configured to drive, via the set voltage, the motor based on an gait status of a user wearing the walking assistance apparatus.

15. A walking assistance apparatus configured to be worn by a user, the walking assistance apparatus comprising:

a driver configured to drive a motor to apply a torque to a joint of the user via a support; and a controller configured to, indirectly measure a rotational speed of a shaft of the motor generated based on an external physical stimulus applied thereto by, measuring, via a rotation sensor, a joint angle of the support mechanically connected to the motor via gears having a gear ratio, determining a speed at which the support rotates based on the joint angle, and calculating the rotational speed of the motor based on the speed at which the support rotates and the gear ratio of the gears, calculate a counter electromotive voltage generated by the motor based on the speed of the motor, and generate a control signal to electrically isolate the driver from the motor based on the counter electromotive voltage generated by the motor.

16. The walking assistance apparatus of claim 15, further comprising:

a switch configured to open based on the control signal such that the driver is electrically isolated from the motor.

* * * * *